US008224986B1

(12) United States Patent
Liskov et al.

(10) Patent No.: US 8,224,986 B1
(45) Date of Patent: Jul. 17, 2012

(54) METHODS AND APPARATUS FOR REDIRECTING REQUESTS FOR CONTENT

(75) Inventors: Barbara Liskov, Waltham, MA (US); John F. Carr, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 2353 days.

(21) Appl. No.: 10/093,579

(22) Filed: Mar. 7, 2002

(51) Int. Cl.
*G06F 15/173* (2006.01)

(52) U.S. Cl. .................................. 709/238; 709/245

(58) Field of Classification Search .................. 709/203, 709/217–226, 238, 245; 707/2, 10
See application file for complete search history.

(56) References Cited

U.S. PATENT DOCUMENTS

| 6,115,752 | A  | * | 9/2000  | Chauhan ..................... 709/241 |
| 6,118,784 | A  | * | 9/2000  | Tsuchiya et al. ............. 370/401 |
| 6,154,777 | A  | * | 11/2000 | Ebrahim ....................... 709/227 |
| 6,182,139 | B1 |   | 1/2001  | Brendel ........................ 709/226 |
| 6,185,598 | B1 | * | 2/2001  | Farber et al. ................. 709/200 |
| 6,243,760 | B1 |   | 6/2001  | Armbruster et al. .......... 709/243 |
| 6,304,913 | B1 | * | 10/2001 | Rune ............................. 709/241 |
| 6,338,082 | B1 | * | 1/2002  | Schneider .................... 709/203 |
| 6,389,462 | B1 |   | 5/2002  | Cohen et al. .................. 709/218 |
| 6,466,995 | B2 | * | 10/2002 | Swales et al. ................. 710/11 |
| 6,513,061 | B1 | * | 1/2003  | Ebata et al. .................. 709/203 |
| 6,580,717 | B1 | * | 6/2003  | Higuchi et al. ............... 370/401 |
| 6,775,687 | B1 | * | 8/2004  | Binding et al. ................ 709/203 |
| 6,785,704 | B1 | * | 8/2004  | McCanne ..................... 718/105 |
| 6,873,849 | B2 | * | 3/2005  | de la Red et al. ............. 455/445 |
| 2002/0010798 | A1 | * | 1/2002 | Ben-Shaul et al. ........... 709/247 |
| 2002/0038360 | A1 | * | 3/2002 | Andrews et al. .............. 709/223 |
| 2002/0147929 | A1 | * | 10/2002 | Rose ............................. 713/201 |

OTHER PUBLICATIONS

Pending U.S. Appl. No. 10/074,548, filed Feb. 12, 2002.
Tewari, et al., IBM Research Report, "On the Effectiveness of DNS-based Server Selection", Jun. 28, 2000, RC 21785 (Log 98085) Computer Science/Mathematics, Total pp. 14.
Barbir, et al., "Known Content Network (CN) Request-Routing Mechanisms", Jul. 2003, pp. 1-18.

* cited by examiner

*Primary Examiner* — Asad M Nawaz
*Assistant Examiner* — Sargon Nano
(74) *Attorney, Agent, or Firm* — BainwoodHuang

(57) ABSTRACT

The invention is directed to techniques in a computer, for processing a content request. In one arrangement a content engine receives a content request from a client, generates a result based on the content request, the result including one of a content-providing value and a redirection value in response to the content request, and selectively provides, to the client, one of (i) content when the result includes the content-providing value, and (ii) a redirection message when the result includes the redirection value, the redirection message including an extended domain name having a client identifier which identifies the client.
The result can be used by a content router or content engine in deciding whether to provide content or a redirection. The decision to selectively provide can be based on client proximity to the content engines, past redirections, content size and type, content engine capacity, content availability and other factors.

18 Claims, 5 Drawing Sheets

METHODS AND APPARATUS FOR REDIRECTING REQUESTS FOR CONTENT

BACKGROUND OF THE INVENTION

The Internet is a network made up of many computer systems, devices, etc. transmitting, receiving, and storing information. In general, client computers (or devices, systems, etc.) initiate requests for content (e.g. files, data, information, etc.) over the Internet network to servers that perform the functions of storing content, etc. and transmitting the content to the client computers in order to satisfy the requests. Several methods are employed in the use of servers and the Internet network to increase the speed of delivery of requested content. For example, in some cases, if the number of requests for certain content exceeds the speed with which a server holding the content would be able to fulfill the requests, the content may be duplicated on more than one server, in order to increase the output speed for the requested content. Another example involves the case of locating servers that are used to store content and fulfill requests as near to the source of the requests as possible, in order to reduce the processing time between a requesting site and the corresponding server(s). Sometimes content can be duplicated or selectively stored on a server or device, called a caching server (e.g. a server that is used to cache content in order to provide quicker delivery) that has been strategically located nearer the source of content requests than the primary server for such content.

Client computer systems, etc. use an IP (Internet Protocol) address to identify and send a content request to any server that holds content which is the subject of a content request. Sometimes the domain name section of Uniform Resource Locators (e.g. URL's) is used to identify servers. The domain name section of Uniform Resource Locators identifies servers using an English-language-like name (e.g. www.cisco.com). In order to use a domain name, a computer program (e.g. an Internet browser) sends a request that includes a domain name to a domain name server. A domain name server is a different kind of server that is capable of storing domain names and/or parts of domain names and IP addresses of servers that the domain names represent. In effect, domain name servers can be used to translate domain names into IP addresses. A domain name server responds to the domain name request by providing the requesting program (e.g. the client's browser program) operating on the requesting client computer system with an IP address translated from the domain name. For example, if the browser on a client computer sends the www.cisco.com domain name to a domain name server, the browser receives the IP address of the www.cisco.com web site back from the domain name server. Upon receipt of the IP address for www.cisco.com, the browser uses the IP address to contact the www.cisco.com server in order to request content.

One method of diverting a request for content to a different server (e.g. another server at the same or at a different location) from the server specified in the initial request, is to execute a redirection. In order to execute a redirection, a server that has received a client request, sends a redirection command (e.g. code 302) back to the client program (e.g. the Internet browser program) on the client computer, along with a domain name of a site to which the browser is to be redirected. As a result of receiving the redirection command (e.g. HTTP code 302), the client program will automatically transmit a new request for the content to the server specified by the new domain name or IP address.

SUMMARY OF THE INVENTION

Unfortunately, there are shortcomings to the conventional methods for accessing cached content over the Internet which result in the delivery of content less effectively than otherwise possible. In particular, the conventional methods for identifying the location of a client requesting content are not always accurate. Conventional systems (e.g. sometimes called content delivery networks) use the IP address of a DNS (domain name service) proxy that acts on behalf of a client to translate the domain name of a client request for content to identify the client location. Although the IP address of a DNS proxy may sometimes predict the actual location of the client requesting content, it is not always an accurate predictor of the client location. As a consequence, requested content, delivered to a client from a server selected by using the IP address of the DNS proxy rather than the actual client location, may end up being delivered in a sub-optimal fashion (e.g. the content may be sent either over a more costly or slower route or one that is restricted in some other manner, etc.).

This may be a significant issue in the case of files that are large (e.g. 100K+ bytes) or other files. It may also be a significant issue for files such as real time video or video-on-demand files because delays in the delivery of those files can disrupt video display. Special care may be necessary to ensure that such video files are obtained from a server or servers that have resources available to provide the files and do so in a timely manner. In other words, there may be significant cost, degradation of speed or other less-than-optimal performance factors, etc. which result from serving content from a content engine (e.g. server) that is not the best choice from available options for serving a particular content request.

Some content delivery networks administer the choice of locations for serving content from among multiple content engines. As a practical matter, at times, specific content may not be immediately available on a particular content engine because of a delay in time for loading designated content onto the content engine. Without an effective way to re-route a client request to another content engine, based upon last-minute information about such a situation, the end result can at times be a failed request for content.

Other circumstances may occur causing a designated content engine for some particular content to be unable to serve the content. For example, at any point in time, a server designated to serve certain content may already be overloaded from attempting to fulfill other content requests or be otherwise incapable due to other capacity limitations (e.g. memory or storage limitations, transmission capacity limitations, etc.). As a result, the designated content engine may not be able to serve requested content within an acceptable response time, or possibly not at all.

Finally, even if a particular content engine is programmed to redirect a content request to an alternative content engine, the redirection might not be effective if the new content engine is either not operational for some reason or otherwise not operating satisfactorily. As a consequence, the new content engine could also fail to deliver requested content or deliver the content too slowly at a point in time after a content request was already delayed once due to the earlier redirection.

Features of embodiments of the invention provide improved methods and techniques for redirecting requests for content. In particular, embodiments of the invention can be used to provide a content router (e.g. computational device)

with information that can be used to select alternative content engines (e.g. computers) for providing content as a result of a client request for content. The methods and techniques can be useful when used in conjunction with a content delivery network.

A content delivery network is a system that controls various content engines containing content, some of which may be cached Internet content. A content delivery network includes a content distribution manager that serves as a control mechanism for the entire content distribution network and content routers that serve as the authoritative source for DNS (domain name service) information within the content distribution network.

Within such a content delivery network, content engines hold content that can be sent to a client (e.g. an Internet browser on a client computer) as a result of a request for content by the client to the content engine. If the content engine to which such a request for content has been sent is either unable to provide the content for some reason, or is not able to provide the content in as effective a manner as another content engine, the content engine is able to redirect (e.g. using a redirection command) the client to request the content from another content engine. The content engine causing a redirection can provide additional information along with the domain name (e.g. an extended domain name) that is sent back to the client and which can be used to make an effective choice from among alternative content engines that can provide the requested content. This information may include the actual IP address of the client computer (e.g. which the content engine is able to obtain from the client request for content) and a list of references showing that prior attempts have been made to request the content from other content engines.

With the information available at the time of receiving the request for content, the content engine can evaluate its ability to fulfill a content request and also account for other factors such as the capacity and workload of the content engine at the time of attempting to fill the request, momentary availability of files, the size and type of files that will be provided, etc. as well as proximity criteria information that the content engine may have available from tables which it maintains.

When the client executes the redirection command received from the content engine, the client first requests a translation of the extended domain name, provided by the content engine, from the DNS proxy. In turn, when a DNS proxy receives a request to translate the extended domain name into the IP address (e.g. or other identifier that can be used to locate a content engine) of a content engine for providing content, the DNS proxy contacts a content router in the content distribution network in order to complete translation of the extended domain name into an IP address, etc. of an alternative content engine.

DNS proxies are part of the Internet system infrastructure. As such, they are configured to transmit extended domain names to other DNS proxies or content routers (e.g. content routers located within a content distribution network) in order to ultimately resolve (e.g. translate) an extended domain name into an IP address represented by the domain name. When a content router receives a request from a DNS proxy (e.g. to translate an extended domain name to an IP address, etc.) the content router can also parse the additional information which is part of the extended domain name provided by the content engine along with the redirection command and use the information provided to make a better informed decision about the best content engine for providing requested content. In particular, using the IP address (or other identifier) of the actual client, a content router is able choose a content engine that is conveniently located for providing content to the requesting client. In addition, by identifying the fact that prior requests for content had been sent to other servers and which servers the requests were sent to (e.g. also provided in the extended domain name), the content router is also able to make a better choice from among content engines that can provide requested content.

After the content engine selection has been made by the content router, the content router sends either an address (e.g. IP address) of the selected content engine or an appropriate NS (name server) record with related information to the DNS proxy. The DNS proxy may then communicate with other servers to obtain the IP address of the selected content engine. The DNS proxy, in turn, sends the IP address (e.g. obtained in either way) to the client to be used by the client in conjunction with the original redirection command. Using the newly provided IP address, the client accesses content from the newly designated content engine.

In one embodiment of the invention, a computer includes a method for processing a content request. The method includes the steps of receiving a content request from a client, and generating a result based on the content request. The result includes one of a content-providing value and a redirection value in response to the content request. The method further includes the step of selectively providing, to the client, one of (i) content when the result includes the content-providing value, and (ii) a redirection message when the result includes the redirection value. The redirection message includes an extended domain name having a client identifier which identifies the client.

In another embodiment, the step of selectively providing includes the step of forming, as at least part of the extended domain name of the redirection message, the client identifier, a domain name and a flag indicating that the extended domain name includes the client identifier which identifies the client. The flag in the extended domain name enables the content router to recognize that the name is extended and to use the information contained in it for evaluating content engine effectiveness to provide content.

In another embodiment, the step of selectively providing includes the step of forming, as at least part of the extended domain name of the redirection message, a domain name, and an Internet Protocol address of the client as the client identifier. The Internet Protocol address enables the content router to evaluate the client request.

In another embodiment, the step of selectively providing includes the step of obtaining a label based on a file name of requested content and sending the label to the client as part of the extended domain name of the redirection message. A label can be associated with other information by the content router.

In still another embodiment, the step of selectively providing includes the step of forming, as at least part of the extended domain name of the redirection message, a list of references to identify computers receiving the prior content request from the client. The content router can use the references to help chose an alternative content engine for providing content in response to a content request.

In another embodiment, the step of generating includes the step of forming the result based on a resource capacity of the computer. The resource capacity of the content engine can be used as a factor in determining if the content engine is a good choice for providing requested content.

In yet another embodiment, wherein content is stored on the computer for responding to the content request and wherein the content request includes a type indicator identifying a type of the content, the step of generating includes the step of forming the result based on the type of the content specified in the content request. The file type of a content request can be used to determine whether a particular content engine should provide requested content.

In yet another embodiment, the step of generating includes the step of forming the result based on an availability of the content, on the computer, to fulfill a content request. The availability of content can be used by the content engine to determine whether to provide requested content.

In another embodiment, the step of selectively providing includes the step of determining whether to selectively provide one of the content and the redirection message, based on reading at least one reference of a list of references to a prior computer receiving the content request that was formed as part of the extended domain name. The references identify content engines to which the request for content were directed earlier. Accordingly, requests to the same content engine can be avoided. Additionally, the content engine can use the number of earlier requests in its evaluation of whether to provide content or a redirection command.

In still another embodiment, the step of selectively providing includes the step of determining whether to selectively provide one of the content and the redirection message, based on a number of references to a prior computer receiving the content request exceeding a predetermined target number. The content engine can be configured to evaluate the number of previous content engines to which the content request may have been directed earlier and repeat the request to a content engine in the list of references if the content engine discovers that a predetermined target number of content requests had been generated. In other words, although a particular content engine might not be the preferred choice to provide the content originally, if the content engine finds other content engines unable to provide content, upon reviewing the references, the content engine may elect to provide the content itself.

In another embodiment, the step of selectively providing includes determining whether to selectively provide one of the content and the redirection message, based on a proximity criteria maintained on the computer. The proximity criteria are used in the determination of whether a particular content engine is the most convenient content engine available to provide requested content.

In another embodiment the step of selectively providing includes the step of determining whether to selectively provide one of the content and the redirection message, based on a file size of the content. In particular, large files may benefit from the advantage of being served from a more convenient content engine.

In another embodiment, the computational device includes a method for handling a request for a computer address, the method comprising the steps of receiving, from a proxy device, a request for a computer address, the request including an extended domain name having a client identifier which identifies a client, processing the extended domain name to identify the computer address and sending the computer address to the proxy device for transmission to the client to access content. The computer address is used by the client to request content from an alternative content engine.

In still another embodiment, the step of processing includes the step of reading, as at least part of the extended domain name in the request for the computer address, a client identifier, a domain name, and a flag indicating that the extended domain name includes the client identifier which identifies the client. The flag notifies the computational device of the existence of a client identifier for use by the computational device to select a content engine.

In yet another embodiment, the step of processing includes the step of reading, as at least part of the extended domain name in the request, a domain name and an Internet Protocol address of the client as the client identifier. The computational device uses the client identifier to choose the most conveniently located content engine for providing content in response to a content request.

In yet another embodiment, wherein the computer address identifies a computer containing the content, the step of processing includes the step of obtaining the computer address from a table of computer addresses identifying computers containing the content based on a proximity of the client to the computer containing the content. Computer addresses from the table are used to select from among alternative content engines.

In another embodiment, the step of processing the extended domain name includes the step of declining to identify the computer address if a computer represented by the computer address is in a list of references to identify the computers receiving the prior content request from the client, formed as at least part of the extended domain name of a redirection message. The content router can select a content engine to provide content. However, the content router avoids redirecting a request to a content engine that had received the content request earlier but did not provide the requested content.

In another embodiment the computational device identifies the computer address, even if the computer represented by the computer address is in the list of references, to identify the computers receiving the prior content request from the client formed as at least part of an extended domain name of the redirection message, when the proximity criteria of the computer represented by the computer address in the list of references is superior to the proximity criteria of other computers. The content router can redirect a content request to a content engine that has already been passed over if the content router determines that other choices will result in an inordinate delay to the client.

In another embodiment, the step of processing includes selecting the computer address based on information maintained on the computational device associated with a label. A label may be a code that is used to reference a string of information that is too large to be included in the domain name. In some cases, a label may represent a filename. In other cases the label may be a channel ID which represents a group of files. Content routers can use channel IDs to identify the location of such channels or groups of files.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Features of the invention provide improved methods and techniques for redirecting requests for content.

Figure 1:
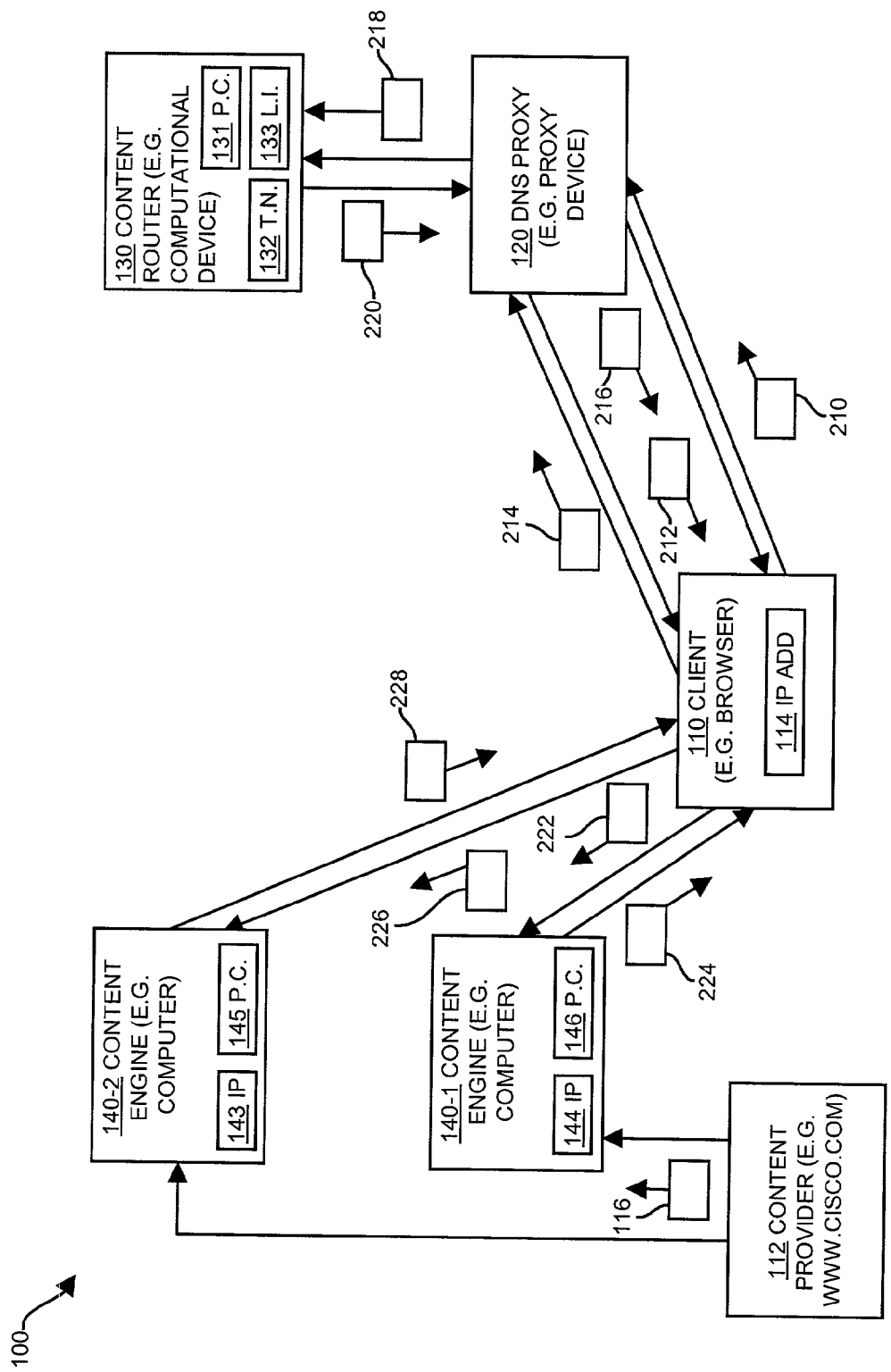
FIG. 1 shows a system suitable for use by the invention.

FIG. 1 shows a system 100 suitable for use by the invention. The system includes a client 110 (e.g. an Internet browser) having an IP (Internet protocol) address 114, a DNS (domain name service) proxy 120 (e.g. proxy device), a content router 130 (e.g. computational device) having a table of proximity criteria 131, a target number 132 and label information 133, content engines 140-1, 140-2 (e.g. computers) each having IP addresses 143, 144 and proximity criteria 145, 146, and a content provider 112 (e.g. www.cisco.com).

Each content engine 140-1, 140-2 is configured to provide content to requesting clients (e.g. the client 110) under the right set of circumstances, or alternatively redirect the clients to another content engine 140-1, 140-2. The content router 130 communicates with DNS proxies (e.g. the DNS proxy 120) in response to DNS requests. As will be explained in further detail later, the content router 130 is configured to process conventional DNS requests by performing a routing decision based on the DNS proxy location, or processing an improved DNS request by performing a routing decision based on a client identifier that identifies a location of the client for providing an improved decision as to where the client is to obtain content.

FIG. 1 also shows a series of messages including an initial DNS request 210 (e.g. to convert a domain name, www.cdn.cisco.com, into the IP address 144 of the content engine 140-1), a message 212 including the IP address of the content engine 140-1, a request 222 for content from the content engine 140-1 (e.g. from www.cdn.cisco.com) using the IP address, a message 224 containing a redirection command and extended domain name (e.g. C-1234567.X-1.L-2764.WWW.C-R.CDN.CISCO.COM) sent by the content engine 140-1, to the client 110, a DNS request 214 (e.g. for translation of the extended domain name provided by the content engine 140-1 to the client 110 along with the redirection command), a message 218 including extended domain name information (e.g. the extended domain name originally provided by the content engine 140-1 to the client 110, forwarded by the DNS proxy 120 to the content router 130), a message 220 with an IP address (e.g. the IP address of a second content engine 140-2) or a name server record, a message 216 with an IP address (e.g. the IP address of the second content engine now being forwarded by the DNS proxy 120 to the client 110), a request 226 for content from the second content engine 140-2 using the IP address (e.g. that was originally sent from the content router 130 to the DNS proxy 120 and in turn to the client 110), and a message 228 containing the requested content (e.g. from the second content engine 140-2).

The system 100 shows the components that may be used to process a redirection command from one content engine 140-1 whereby the extended domain name provided to the client 110, by the content engine 140-1, is processed by both a DNS proxy 120 and a content router 130, and wherein the content router 130 provides an IP address of another content engine 140-2 which the content router 130 selects as an alternative source for providing content to the client 110 originally requesting content. The extended domain name provided by the content engine 140-1 first contacted by the client 110 includes additional information that is used by the content router 130 when determining which alternative source (e.g. an alternative content engine such as 140-2) to cause the content request 222 to be redirected to.

Although FIG. 1 shows 2 content engines, it should be understood that one or more content engines can exist and that the procedures described herein apply to any of the content engines. It should also be understood that the components described can exist in different configurations. For example, the function performed by the DNS proxy 120 (e.g. the proxy device), displayed here as being performed by on a separate device, could instead function as a separated process on a client 110. Other configurations are also possible.

Figure 2A:
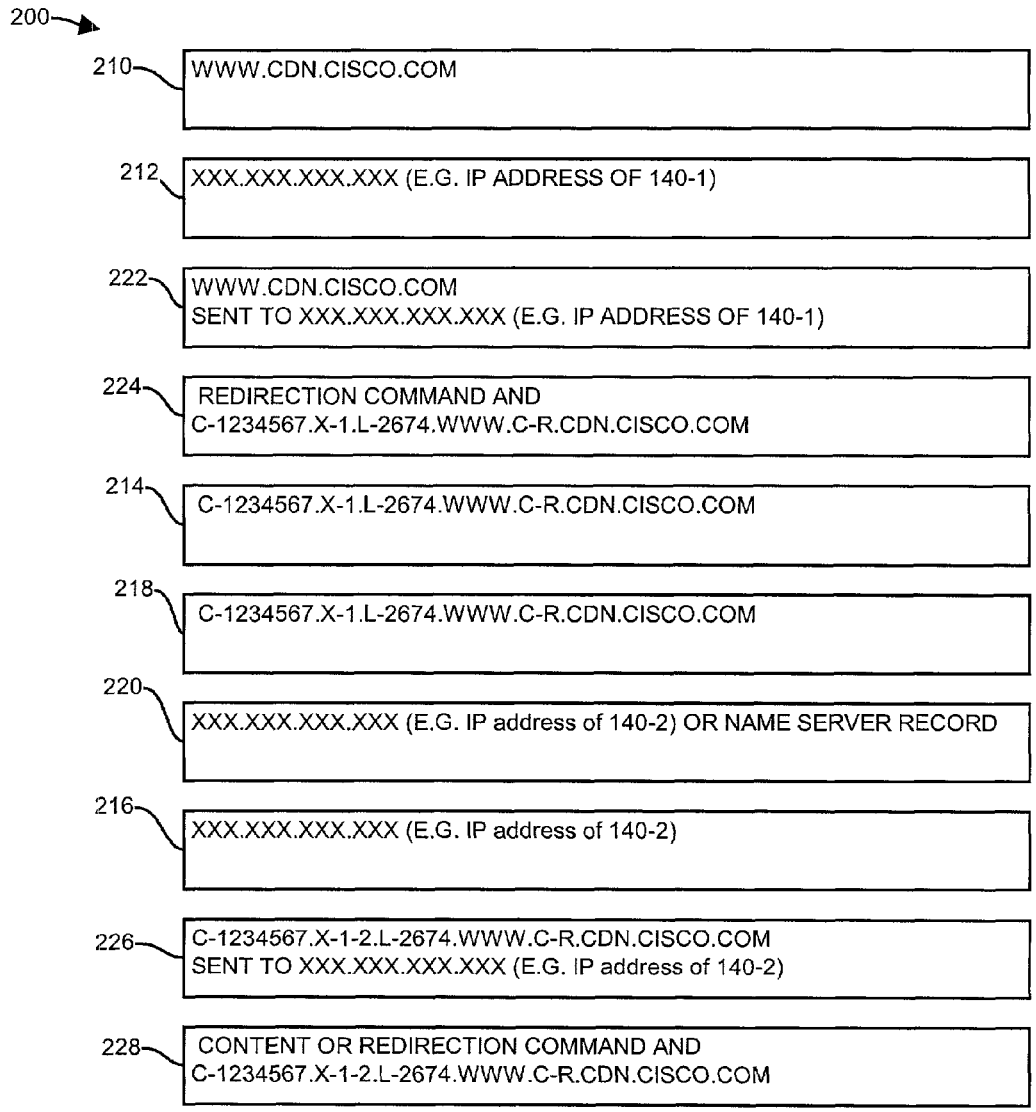
FIG. 2A shows a series of individual messages containing extended domain names and IP addresses exchanged between the components of the system in one embodiment of the invention.

Further details of the invention will now be provided with reference to FIG. 2A.

FIG. 2A is a diagram showing the content of the various individual messages that are transferred between the components of the system 100 as shown in FIG. 1. FIG. 2A shows the sequence of messages traveling between the different components. The messages are either in the form of an IP address (sometimes a NS record or other information can alternatively be provided which the DNS proxy may use to indirectly obtain an IP address), which is used by a client system 110, to contact a computer or other device such as a content engine 140-1, 140-2, etc. or in the form of an extended domain name that must first be translated by a DNS proxy into an IP address so that a client 110 can use the IP address to contact a computer or device.

IP addresses are 32 bit numbers which can follow the form XXX.XXX.XXX.XXX where each XXX is a number from 0 to 255 (at least one XXX must be non-zero). The IP address serves as a unique identifier of individual computers, devices, etc. Extended domain names may also contain other information, besides the information that references an IP address, such as, for example, the client identifier and prior request list as will be discussed in FIG. 2B. Some messages 224, 228 may also include a redirection command, that causes a client 110 to initiate a request for content using the extended domain name provided as part of the message. Further details of the invention will now be provided with respect to FIG. 2B.

Figure 2B:
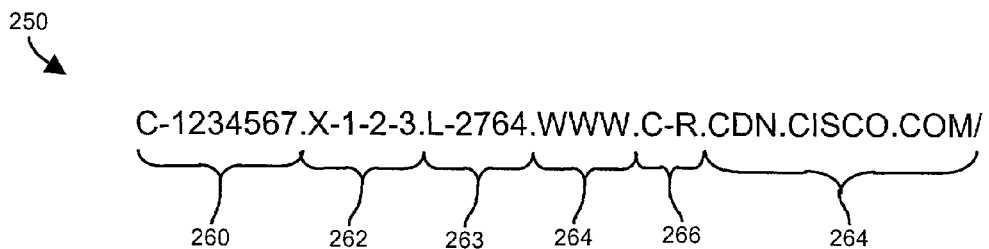
FIG. 2B depicts an example of an extended domain name that is sent to a client with a redirection command.

FIG. 2B depicts an example of an extended domain name 250 sent by the content engine 140-1, 140-2, etc. to a client 110 along with a redirection command. FIG. 2B includes a client identifier 260, an ID reference list 262 of prior content engines 140-1, 140-2, etc. to which requests for content have been directed, a label 263, the original domain name 264, and a flag 266 indicating the existence of a client identifier 260. The client identifier 260, list of prior content engines 140-1, 140-2, etc., and label 263 (e.g. C-1234567, X-1-2-3, and L-2674) provide information, ultimately, to the content router 130, that the content router 130 can analyze when choosing the best content engine 140-1, 140-2, etc. for obtaining requested content 228. In addition, in some cases, the list of prior content engines X-1-2-3 (e.g. 140-1, 140-2), etc. and label 263 could also be configured to contain other information, as well. Further details of the invention will now be provided with reference to FIG. 3.

Figure 3:
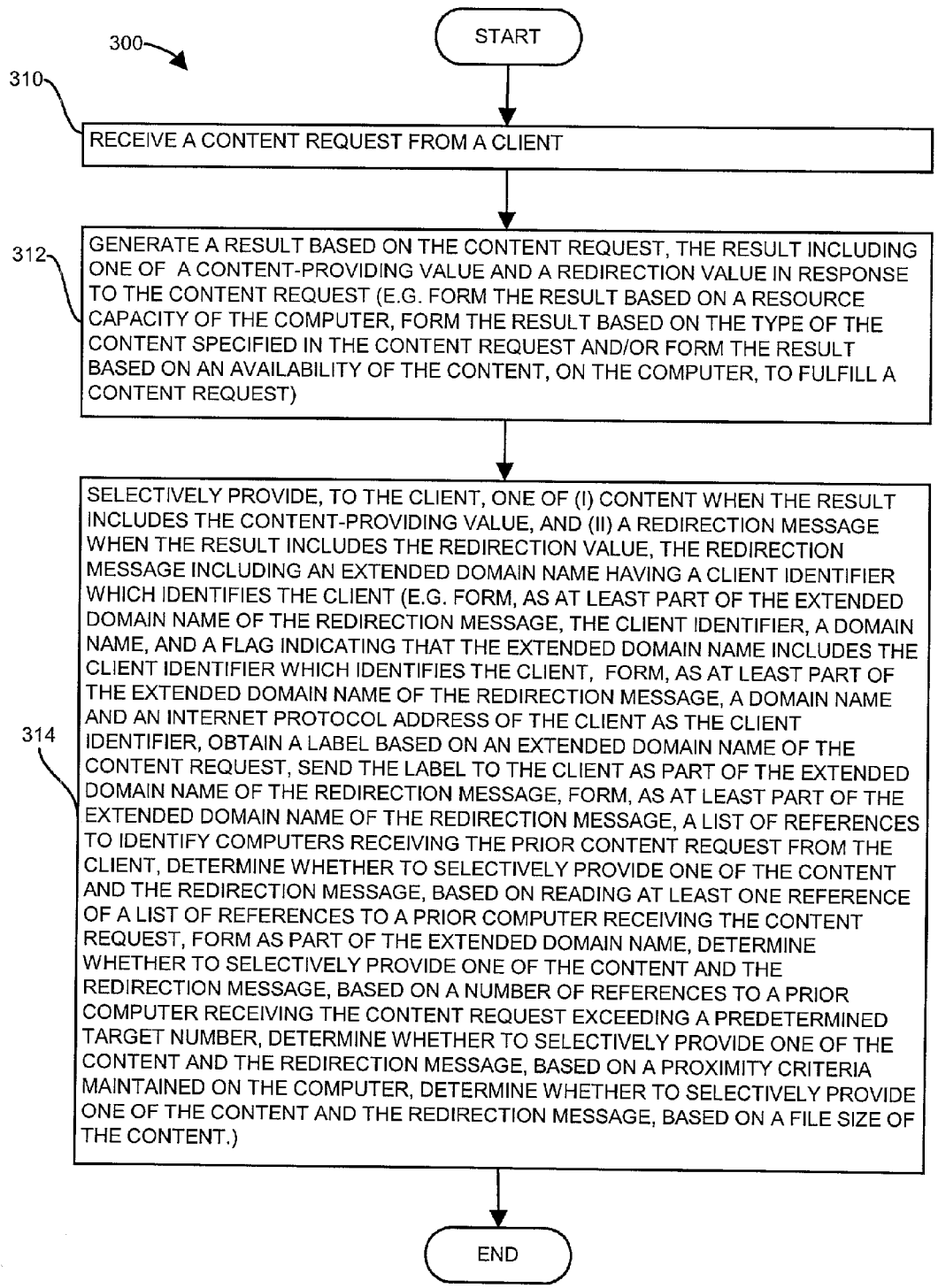
FIG. 3 is a flow chart of a procedure performed by a content engine in one embodiment of the invention.

FIG. 3 is a flow chart of a procedure 300 performed by the content engines 140-1, 140-2, etc. FIG. 3 describes the procedure conducted by the content engine 140-1 after receiving a request for content 222 from a client 110 (e.g. an Internet browser operating on a client computer). The procedure results in the content engine 140-1 sending extended domain name information, via a DNS proxy 120, to a content router 130. The information can be used by the content router 130 to identify the best content engine 140-2, etc. for providing the content (e.g. 226).

In step 310, the content engine 140-1 receives a content request 222 from a client 110. The client 110 may send the content request 222 as the first request to a content engine 140-1; the client 110 may also already have sent the content request 222 to other content engines, 140-1, 140-2, etc. as well. For example, a request for content 222 which the client 110 sends to the content engine 140-1 may occur as one of a series of content requests, some of which were previously directed to other prior content engines (e.g. content engines other than 140-1) prior to being submitted to the present content engine 140-1.

In step 312 the content engine 140-1 generates a result based on the content request 222, the result including one of a content-providing value and a redirection value in response to the content request 222. The content engine 140-1 can also form the result based on a resource capacity of the computer. The content engine 140-1 can form the result based on the type of the content (e.g. whether the content is video, audio, text, etc. content) specified in the content request 222 and/or the content engine 140-1 can form the result based on an availability of the content, on the computer, to fulfill a content request 222.

Accordingly, the content engine 140-1 determines whether to provide the content requested by the client 110 or to generate a redirection command causing the client 110 to automatically initiate another content request 226 for the content 228 from another content engine 140-2.

A content engine 140-1 can be configured to evaluate the circumstances that relate to fulfilling a request for content 222 instead of simply attempting to return the requested content to a client 110. For example, the content engine 140-1 may be configured to first check whether the content engine 140-1 has the requested content (e.g. the requested files) available that were the subject of the content request 222. In another variation, if the client 110 has requested that the content engine 140-1 provide content that actually originates from another source (e.g. such as live video that is actually sourced, by the content engine 140-1, from another location) the content engine 140-1 may first determine if the content being sourced from the other location is currently available for transmission to the client 110.

In another example, the content engine 140-1 may determine to provide content by a redirection to another content engine 140 based simply on the type of content (e.g. certain types of files such as images, text, etc.) requested and accordingly not provide content of a certain type (e.g. not provide any live video content because it might overburden the particular content engine 140-1).

Another example, is that the content engine 140-1 may also determine other factors, such as, for example, whether the content engine 110 has adequate systems resources (e.g. the memory, the processing capacity, the network communications channels, etc.) available as would be needed to process the content request 222 at the time of the content request 222 receipt by the content engine 140-1.

The content engine 140-1 may also evaluate the IP address 114 of the client 110, using the IP address 114 (e.g. or other identifier) of the client 110 as an indicator of the location of the client 110 and comparing the IP address 114 of the client 110 to a table of such IP addresses, in order to determine whether the client 110, based on its location, is in a convenient location with respect to the content engine 140-1 such that the content engine 140-1 is an acceptable source to fulfill the client's 110 content request 222.

In step 314, the content engine 140-1 selectively provides, to the client 110, one of (i) content 228 when the result includes the content-providing value, and (ii) a redirection message 224 when the result includes the redirection value, the redirection message 224 including an extended domain name 250 having a client identifier 260 which identifies the client 110. The content engine 140-1 can also form, as at least part of the extended domain name 250 of the redirection message, the client identifier 260, a domain name 264 and a flag 266 indicating that the extended domain name includes the client identifier 260 which identifies the client 110. The content engine 140-1 can also form, as at least part of the extended domain name 250 of the redirection message 224, a domain name 264 and an Internet protocol address 260 of the client 110 as the client identifier 260. The content engine 140-1 can form, as at least part of the extended domain name 250 of the redirection message 224, a list of references 262 to identify computers (e.g. content engines 140-1, 140-2, etc.) receiving the prior content request 222 from the client 110.

The content engine 140-1 can also obtain a label based on the file name contained in the content request 222 and send the label 263 to the client 110 as part of the extended domain name 250, sent to the client in conjunction with the redirection message 224. The label 263 can serve as a reference to other information that may be interpreted by another content engine 140, a content router 130, or other devices. The label may also be a reference to a channel or a grouping of files or content that is maintained and interpreted by a content router 130. It may also be used as a reference to a file name.

The content engine 140-1 determines whether to selectively provided one of the content 228 and a redirection message 224, based on reading at least one reference of a list of references 262 to a prior computer 140 receiving the content request 222, formed as part of the extended domain name 250. The content engine 140-1 determines whether to selectively provide one of the content 228 and the redirection message 224, based on the number of references 262 to prior content engines 140-2 in the content request 222 exceeding a predetermined target number 132. The content engine 140-1 determines whether to selectively provide one of the content 228 and the redirection message 224, based on proximity criteria 146 maintained on the content engine 140-1. The content engine 140-1 also determines whether to selectively provide one of the content 228 and the redirection message 224, based on a file size of the content.

In other words, if the content engine 140-1 is an acceptable source for fulfilling the client 110 content request 222, based on evaluations made by the content engine 140-1, as previously described, the content engine 140-1 can fulfill the content request 222. If the content engine 140-1 is not acceptable to fulfill the content requested 222, the content engine 140-1 can transmit a redirection command 224 (e.g. a code 302) to the client 110 and provide an extended domain name 250 which includes a client identifier 260 (e.g. an IP address or code representing an IP address or which can be resolved or translated in some way into an identifier of the client 110).

Although the client identifier may be the actual IP address of the client, it should be understood that other methods of identifying a client are also possible. For example, a client identifier could be used that is mapped to client location information using a table or a content engine 140 or a content router 130 may be diverted to another location capable of identifying the client in some fashion.

The content engine 140-1 also uses a list of references (e.g. as part of the extended domain name 250) to identify any content engines 140 that may have received a content request 222 earlier. In one scenario, the content engine 140-1 reviews any content engines 140 listed in the list of references 262, in order to determine if the content engine 140-1 is the preferable content engine 140-1 for providing the requested content 228, or if another content engine 140 is preferable. Such a content engine 140-1 may be configured such that, if any particular content engine 140 is listed in the list of references, the content engine 140-1 doing the evaluation may decide to provide the requested content rather than redirect the request. Other scenarios are also possible.

The content engine 140-1, processing a content request 222, may also be configured to take a particular action based on the number of content engines 140 listed in the list of references 260. For example, a content engine 140-1 processing a content request 222 may determine that it should provide content 228 rather than attempt to redirect the content request 222 to a preferable content engine 140, if, for example, there were already 3 previous attempts to obtain the content 228 from other content engines 140, as in some cases, might be desirable, to avoid excessive delay.

The content engine 140-1 can maintain a table of proximity criteria 145 that the content engine 140-1 can use to determine which is the most convenient content engine 140 for providing content 228, in response to any particular content request 222. The proximity criteria 145 may be based on various different measures, including such measures as actual network distance between the content engines 140 and client 110, the speed and/or capacity of the communications channels existing between the content engines 140 and client 110, etc. Accordingly, the content engine 140-1 is able to make a determination about whether it or another content engine 140 is a better choice for providing requested content 228 and either decide to provide the content itself or redirect the content request 222 to another appropriate content engine 140.

The content engine 140-1 may also determine whether to provide content 228 or redirect a content request 222 to another content engine 140 basing the decision, in whole or in part, upon the file size of the content 228 being provided. In particular, larger files are more susceptible to either an increase or decrease in transmission time experienced as a result of the differing speed with which different content engines 140 may be able to provided requested content 228 to a client 110.

If a client identifier 260 (e.g. IP address of the client 110) is sent to the content router 130 via the client 110, the client identifier 260 will become available to the content router 130, as will be described in more detail later. In turn, the content router 130 uses the client identifier 260 to identify the most conveniently placed content engine 140-1 with respect to the location of the client 110. In order to do so, the redirection command 224, which the content engine 140-1 sends to the client 110 will cause the client 110 to first, initiate a DNS (domain name service) request 214 to the DNS proxy and after receiving a response 216 from the DNS proxy, cause the client 110 to initiate another content request 226 to another content engine (e.g. 140-2).

As described earlier, the content engine 140-1 provides the extended domain name 250, containing, among other things, a client identifier 260, such as an IP address of the client 110, to the client 110. In addition, the extended domain name may also contain a list of reference IDs 262 to identify content engines 140-1, 140-2, etc. that had received the prior content request 222 from the client 110. When the client 110 receives the extended domain name 250, the client 110 forwards the extended domain name 250 (e.g. that is part of message 218) to the DNS proxy 120 in order to resolve the extended domain name 250 into an IP address. In turn, the DNS proxy 120 may send the extended domain name 250 information to other DNS proxies 120 and/or to the content router 130. The content router 130 uses the information provided as part of the extended domain name 250 to make a judgment from among alternative content engines 140-1, 140-2, etc. that may or may not be capable of providing the requested content 224 which the client 110 should request the content 226 from next. The content router 120 will send the IP address of the chosen content engine 140-2 back to the DNS proxy 120, to be, in turn, sent to the client 110.

In some cases, the content router 120 actually sends a name server record back to the DNS proxy 120, instead of an IP address of the chosen content engine 140-2, if the content router 120 needs additional DNS server information to complete translation of the extended domain name 250 to an IP address of the chosen content engine 140-2. In that case, the DNS proxy may exchange information with one or more other servers in order to resolve the desired IP address before sending the IP address back to the client 110.

The client 110 is then able to use the IP address 143, sent to the client 110, in order to request content 226 from another content engine 140-2.

Figure 4:
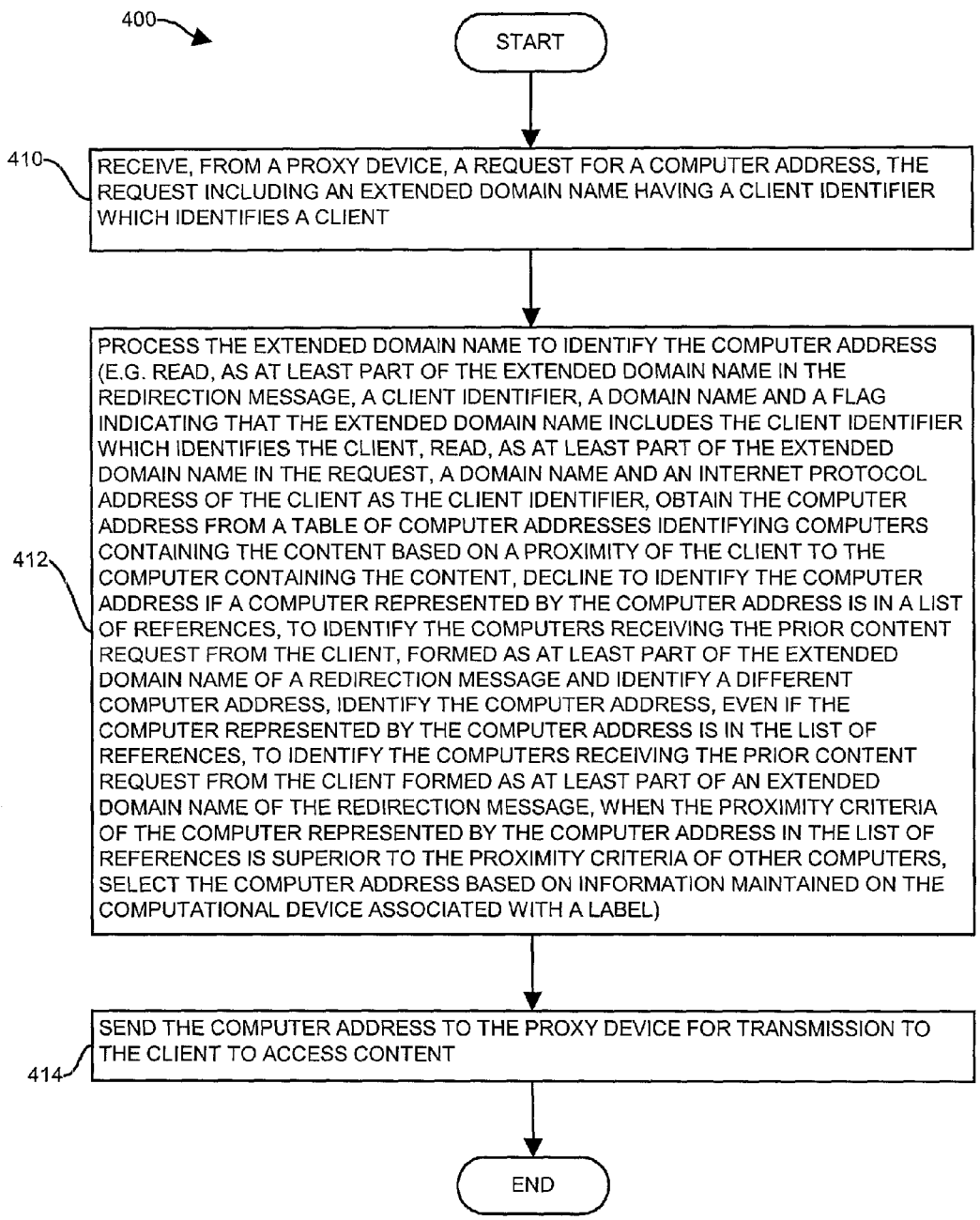
FIG. 4 is a flow chart of a procedure performed by the content router in one embodiment of the invention.

Further details of the invention will now be provided with reference to FIG. 4.

FIG. 4 is a flow chart of a procedure 400 performed by the content router 130.

In step 410, the content router 130 receives, from a proxy device 120, a request for a computer address 218 (e.g. IP address or NS record that the DNS proxy 120 uses in the process of resolving the request for a computer address 218 or an IP address itself). The request 218 includes an extended domain name 250 having a client identifier 260 which identifies a client 110.

After the client 110 requests that the DNS proxy 120 resolve (e.g. translate) the extended domain name 250, received from the content engine 140-1, as discussed earlier, the DNS proxy 120 sends a request 218, which is received by the content router 130, for further information to resolve the extended domain name 250. The request 218 includes the identity of the client (e.g. the client 110, IP address 260) and a list of prior requests 262 as well as other information.

In step 412, the content router 130 processes the extended domain name 250, received from the DNS proxy 120, in order to identify the computer (e.g. the content engine 140-2, etc.) IP address 143. The content router 130 also reads, as at least part of the extended domain name 250 in the redirection message, a client identifier 260, a domain name 264 and a flag 266 indicating that the extended domain name 250 includes the client identifier 260 which identifies the client 110. The content router 130 can also read, as at least part of the extended domain name 250 in the request 218, a domain name 264, and an Internet protocol address 114 of the client 110 as the client identifier 260. The content router 130 can obtain the computer address 114 of the client 110 as the client identifier 260. The content router 130 can also obtain the computer address 143 from a table of computer addresses (e.g. proximity criteria 131) identifying computers 140-2 (e.g. content engines) containing the content 228 based on a proximity of the client 110 to the computer 140-2 (e.g. content engine) containing the content 228. Proximity criteria 131 may include various different measures of desirability of content engines 140 for providing content, such as, for example, actual physical closeness of the content engine 140, volume or other capacity measurements, etc.

The content router 130 may decline to identify the content engine 140 address if a content engine 140 represented by content engine address is in a list of references 262 to identify the content engines 140 receiving a prior content request 222 from the client 110, formed as at least part of the extended domain name 250 of a redirection message 224. The content router 130 can then identify a different content engine 140. The content router 130 may identify the content engine address 140, even if the content engine 140 represented by the content engine 140 address is in the list of references to identify the content engines 140 receiving a prior content request from the client 110 formed as at least part of an extended domain name 250 of the redirection message 224 when the proximity criteria 131 of the content engine 140 represented by the computer address 144 is superior to the proximity criteria 131 of the content engine 140 represented by the content engine 140 in the list of references 262. The content router 130 may also select the content engine 140 address based on information maintained on the computational device associated with a label 133.

The content engine 140-1 may be configured to, in some cases, provide only a flag and no content engine 140-1 ID in the list 262, in order to show that a prior request for content was directed to the content engine 140-1 designated by the extended domain name 250, but that the content engine 140-1 did not provide the requested content 228. For example, if the content engine 140-1 was unable to know for sure if it was an acceptable content engine 140-1 to provide the content 228, the content engine 130 may allow the decision about which content engine 140-2, etc. should provide requested content 228 to be determined by the content router 130. The content router 130, at times, may be in a better position to make that decision, by virtue of having more information available to the content router 130 than does a content engine 140-1.

Also, the content router 130 may avoid providing the address of a particular content engine 140 to the client 110 if the content engine 140 that would otherwise be selected had already been sent the content request 220 earlier and, as a result, was listed among the content engine 140 references 262. On the other hand, the content router 130 may select content engine 140 if content router 130 determines, from evaluation of the list of references 262 and a table of computer addresses (e.g., proximity criteria 131), that earlier-selected content engine 140 is a better choice to provide content than other content engines that have not been selected previously.

The extended domain name 250 may also include a label 263 that may be interpreted by the content router 130. Upon reception of the extended domain name 250 with a label 263, the content router 130 may look up label information 133 maintained on the content router 130 or some other place which can be used to identify channels or groups of content, locations, content engine 140 location of content 228, filenames or other information, etc.

It is possible, that certain clients 110 might be unable to handle some or all of the additional information contained in an extended domain name 250 that does not otherwise exist in a conventional domain name of the redirection message. In that case, a variation of the method can be employed to store such information as a client identifier 260, prior content engine references 262, flag 266, etc. used by content engines 140 and content routers 130, etc. whereby such information is referenced by a label.

In the alternative, the filename field, as used in a conventional URL, may be replaced by a label which references the additional and other information and which could either be looked up and/or mapped by the content engines 140, then used as needed.

Other methods may also be employed to exchange information between the devices of the embodiments of the invention without the modification or expansion of the conventional domain name, as previously discussed. In one case, content engines 140 and content routers 130 may be configured to communicate information about content requests 222 directly, rather than by adding such information to a conventional domain name in order to create an extended domain name 250 and interpreting the information upon its reception. In another case, content engines 140 may be configured to redirect content requests 222 to the address of a third location which has or can obtain the information otherwise needed for evaluation and processing of content requests 222.

In step 414, the content router 130 sends the computer address 143 to the proxy device 120 for transmission to the client 110 to access content 228.

Figure 5:
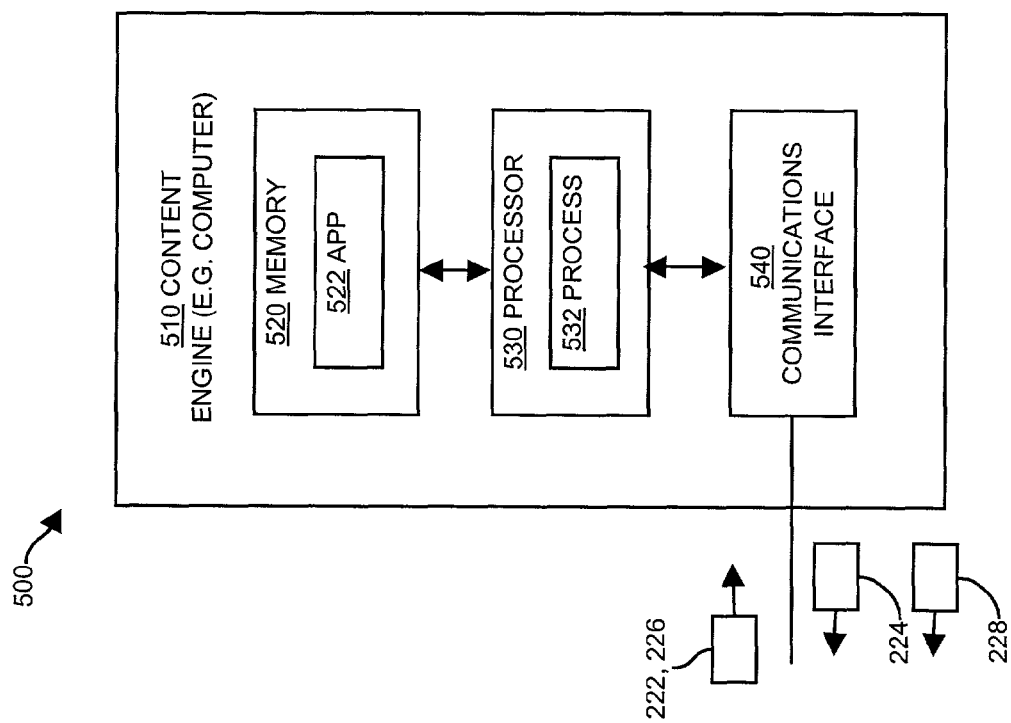
FIG. 5 depicts an implementation of a content engine on a general purpose computer.

Further details of the invention will now be provided with reference to FIG. 5.

FIG. 5 shows an embodiment of the invention 500 in which the content engine 140-1, 140-2, etc. is implemented using a general purpose computer 510. The content engine 140-1 includes a memory 520, capable of storing programs such as 522 (only one program is shown for convenience of explanation; more than one is possible), a processor 530, which can run an application process 532, (only one process is shown for convenience of explanation; more than one is possible) and a communications interface 540. FIG. 5 also shows multiple requests for content 222, 226 received from a client 110, a redirection command with an extended domain name 224 and actual content 228 sent to the client 110. The general purpose computer 500 embodiment of the invention can provide functionality as described earlier with respect to various embodiments of the invention.

Programs or portions of programs 522 may be temporarily stored in the memory 520 and transferred between memory 520 and the processor 530 to which the memory is coupled. The memory 520, for example, may store a content engine program and other content delivery network-related programs, as well as other programs such as operating systems or other application software programs. Other combinations of programs or portions thereof may be stored in the memory 520 as well. The general purpose computer 510 also uses a communications interface 520 to receive content requests 222, 226 from clients 110 and transmit either a redirection command and an extended domain name 224 or the requested content 228 back to a client 110.

The processes of receiving a request for content 222, 226, analyzing the request for content 222, 226 and/or other information, forming an extended domain name 250 and transmitting a redirection command and extended domain name 250, or the requested content 228 back to a client 110 are performed on a general purpose computer 510 in the same manner as depicted in FIGS. 1-4. Further details of the invention will now be provided with reference to FIG. 6.

Figure 6:
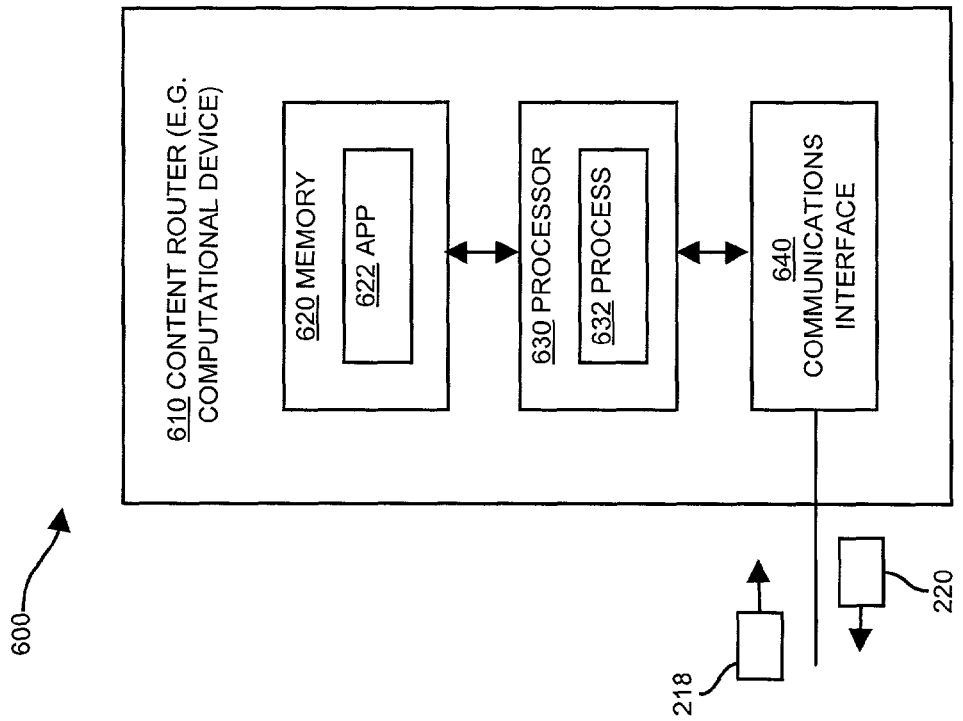
FIG. 6 depicts an implementation of a content router on a general purpose computer.

FIG. 6 shows an embodiment of the invention 600 in which the content router 130 is implemented using a general purpose computer 610. The content router 130 includes a memory 620, capable of storing programs such as 622 (only one program is shown for convenience of explanation; more than one is possible), a processor 630, which can run an application process 632, (only one process is shown for convenience of explanation; more than one is possible) and a communications interface 640. FIG. 6 also shows a request 218 for routing information, received from a DNS proxy 120, including an client identifier 260 and possibly an ID of a selected content engine 140-1. The general purpose computer 600 embodiment of the invention can provide functionality as described earlier with respect to various embodiments of the invention.

Programs or portions of programs 622 may be temporarily stored in the memory 620 and transferred between memory 620 and the processor 630 to which the memory is coupled. The memory 620, for example, may store a content delivery network program or programs, as well as other programs such as operating systems or other software application programs. Other combinations of programs or portions thereof may be stored in the memory 620 as well. The general purpose computer 610 also uses a communications interface 620 to receive requests for routing information from a DNS proxy 218 and send messages 220 with an IP address 143 of a content engine 140-2.

The processes of receiving a request for routing information 218, analyzing the request for routing information 218, and transmitting an address of a selected content engine 140-2 as a part of the redirection process are performed on a general purpose computer 610 in the same manner as described in FIGS. 1-4.

As described above, the invention is directed to methods and techniques for redirecting requests for content. In particular, embodiments of the invention can be used to provide a content router with information that can be used to select from among alternative content engines for providing content in response to of a client request for content. The techniques can be useful when used in conjunction with a content delivery network.

In particular, content engines may hold content that can be sent to a client (e.g. an Internet browser on a client computer). If the content engine to which a request for content has been sent, is either unable to provide the content for some reason, or is not able to provide the content in as effective a manner as another content engine, the content engine is able to redirect the client to request content from another content engine. The content engine, causing a redirection, can also include additional information as part of an extended domain name, which is sent to the content router via the client and DNS proxy and which can be used to make a choice from among alternative content engines that can provide the requested content.

By providing information at the time of receiving the request for content, the content engine effectively provides information about the current ability of the content engine to fulfill a content request and is therefore able to account for such circumstances as the capacity and workload of the content engine at the time of attempting to fill the request, momentary availability of files, etc.

When the client executes the redirection command received from the content engine, the client first requests a translation of the extended domain name, provided by the content engine, from the DNS proxy. In turn, when a DNS proxy receives the request to translate the extended domain name into the IP address of a content engine for providing content, the DNS proxy contacts a content router in the content distribution network in the form of a request for information from the content router.

When a content router receives a request from a DNS proxy (e.g. to translate an extended domain name to an IP address of a content engine) the content router can also parse the additional information which is part of the extended domain name and use the information provided to make a better-informed decision about the preferred content engine for providing requested content. Accordingly, a content router is able choose a content engine that is conveniently located for providing content to the requesting client using additional information that the content router has available. After the content engine selection has been made by the content router, the content router sends the IP address of the selected content engine to the client, via the DNS proxy, in order to complete the client's request for content.

The features of the invention may be employed in data communications device and other computerized devices such as those manufactured by Cisco systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, a typical data communications network includes many hosts interconnected by various communications devices. Communications devices can be routers, bridges, switches, access servers, gateways, hubs, concentrators, proxy servers, repeaters and so forth which exchange data over an interconnection of data links. These may be physical connections or may also be provided using wireless communication mechanisms. In some cases they may also be as simple as wire connections between two devices. The network allows data to propagate between various applications that execute on the hosts. Also, content routers and content engines could be configured in different ways including simple devices (e.g. a blade of a switch).

Various physical or hardware data communications connection mechanisms allow devices to interconnect with the network 105. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices.

What is claimed is:

1. A system for routing content requests comprising:
   a server, which is configured to generate a result based on a content request from a client, the result including one of a content-providing value and a redirection value in response to the content request and to selectively provide, to the client, (i) content when the result includes the content-providing value, and (ii) a redirection message when the result includes the redirection value, the redirection message including an extended domain name having a client identifier which identifies the client, the client being the source of the content request; and
   a content router, which is configured to receive, from a domain name service proxy device, a request for a computer address, the request including an extended domain name having the client identifier which identifies a client, to process the extended domain name to identify the computer address, and to send the computer address to the domain name service proxy device for transmission to the client to access content.

2. The system of claim 1 wherein, to selectively provide the redirection message, the server is configured to:
   form, as at least part of the extended domain name of the redirection message, the client identifier, a domain name, and a flag indicating that the extended domain name includes the client identifier which identifies the client.

3. The system of claim 1 wherein, to selectively provide the redirection message, the server is configured to:
   form, as at least part of the extended domain name of the redirection message, a domain name, and an Internet Protocol address of the client as the client identifier.

4. The system of claim 1 wherein, to selectively provide one of content and a redirection message, the server is configured to:
   obtain a label based a file name of requested content; and
   send the label to the client as part of the extended domain name of the redirection message.

5. The system of claim 1 wherein, to selectively provide one of content and a redirection message, the server is configured to:
   form, as at least part of the extended domain name of the redirection message, a list of references to identify computers receiving a prior content request from the client.

6. The system of claim 5, wherein, to form the list of references, the server is configured to include an identifier of itself in the list of references.

7. The system of claim 1 wherein, to generate the result, the server is configured to:
   form the result based on a resource capacity of the server.

8. The system of claim 1 wherein content is stored on the server for responding to the content request, wherein the content request includes a type indicator identifying a type of the content, and wherein, to generate the result, the server is configured to:
   form the result based on the type of content specified in the content request.

9. The system of claim 1 wherein the server, to generate the result, is configured to:
   form the result based on an availability of the content, on the server, to fulfill a content request.

10. The system of claim 1 wherein, to selectively provide, the server is configured to:
    determine whether to selectively provide one of the content and the redirection message, based on reading at least one reference of a list of references to a prior computer receiving the content request, formed as part of the extended domain name.

11. The system of claim 10, wherein, to selectively provide, the server is configured to determine whether a predetermined alternative server is listed in the list of references.

12. The system of claim 1 wherein, to selectively provide, the server is configured to:
    determine whether to selectively provide one of the content and the redirection message, based on a number of references to a prior computer receiving the content request exceeding a predetermined target number.

13. The system of claim 1 wherein, to selectively provide, the server is configured to:
    determine whether to selectively provide one of the content and the redirection message, based on a proximity criteria from a table maintained on the server.

14. The system of claim 1 wherein, to selectively provide, the server is configured to:
    determine whether to selectively provide one of the content and the redirection message, based on a file size of the content.

15. The system of claim 1 wherein the selectively providing is selected from the group comprising: forming, as at least part of the extended domain name of the redirection message, the client identifier, a domain name, and a flag indicating that the extended domain name includes the client identifier which identifies the client; forming, as at least part of the extended domain name of the redirection message, a domain name, and an Internet Protocol address of the client as the client identifier; obtaining a label based on the file name of the content request, and sending the label to the client as part of the extended domain name of the redirection message; forming, as at least part of the extended domain name of the redirection message, a list of references to identify computers receiving a prior content request from the client; determining whether to selectively provide one of the content and the redirection message, based on reading at least one reference of a list of references to a prior computer receiving the content request, formed as part of the extended domain name; determining whether to selectively provide one of the content and the redirection message, based on a number of references to a prior computer receiving the content request exceeding a predetermined target number; determining whether to selectively provide one of the content and the redirection message, based on a proximity criteria maintained on the computer; and determining whether to selectively provide one of the content and the redirection message, based on a file size of the content;
   and wherein the generating includes at least one of the group comprising:
      determining whether to selectively provide one of the content and the redirection message, based on a proximity criteria maintained on the computer; and
      determining whether to selectively provide one of the content and the redirection message, based on a file size of the content.

16. The system of claim 1, wherein:
    the request for a computer address is a second domain name service (DNS) request succeeding a first DNS request generated by the client, the first DNS request including an unextended domain name lacking the client identifier;
    the server is a first content server previously selected by the content router in response to the first DNS request from the client to provide requested content to the client; and
    the computer address identified by the content router is a computer address of a second content server determined by the content router to be well suited to deliver the requested content to the client based on the client identifier of the extended domain name of the second DNS request.

17. The system of claim 1 wherein, to process the extended domain name, the content router is configured to (1) decline to identify the computer address if a computer represented by the computer address is in a list of references, to identify the computers receiving a prior content request from the client, formed as at least part of the extended domain name of a redirection message, and (2) identify a different computer address.

18. The system of claim 1 wherein, to process the extended domain name, the content router is configured to identify the computer address even if the computer represented by the computer address is in a list of references identifying computers receiving the prior content request from the client, the list of references being formed as at least part of an extended domain name of the redirection message, when the proximity criteria of the computer represented by the computer address in the list of references is superior to the proximity criteria of other computers.

* * * * *